March 2, 1937.  M. EWALD  2,072,103
PROCESS OF MANUFACTURING CORING SPOONS
Filed Feb. 15, 1934
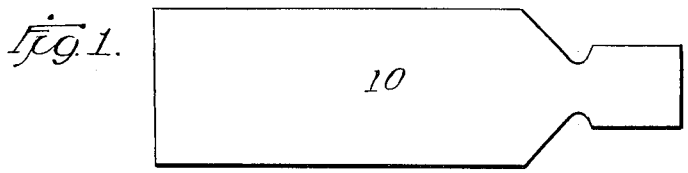
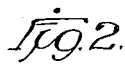
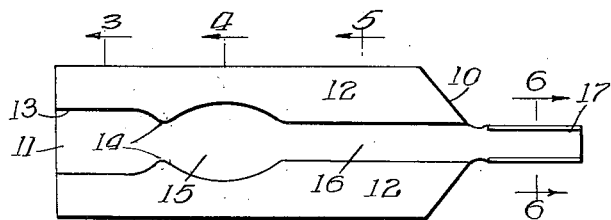
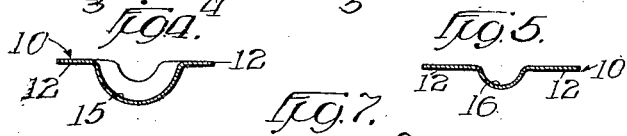
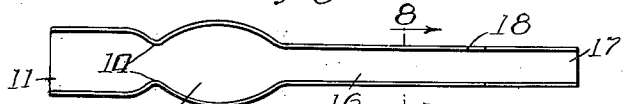
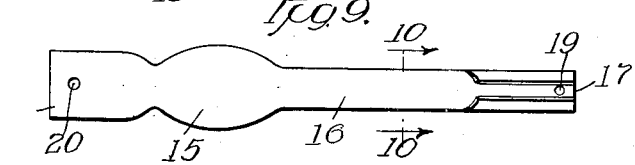
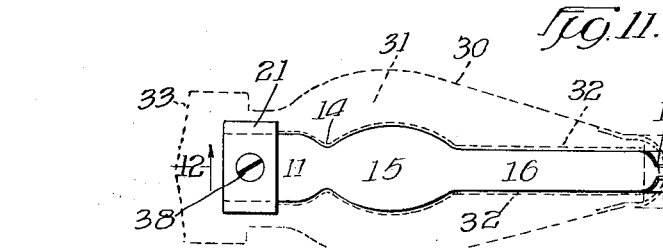
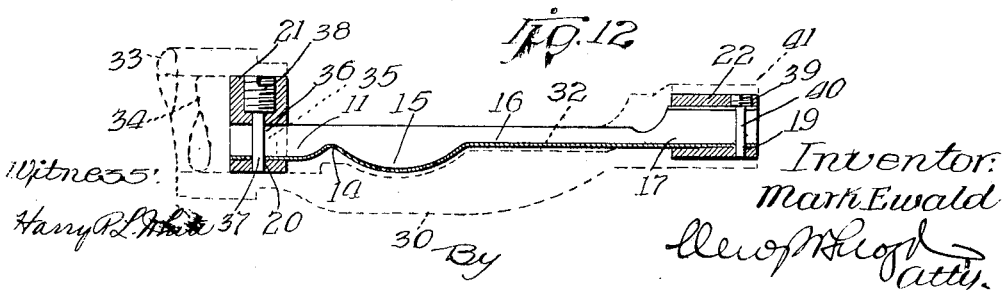
Inventor:
Mark Ewald Patented Mar. 2, 1937

2,072,103

UNITED STATES PATENT OFFICE 2,072,103

PROCESS OF MANUFACTURING CORING SPOONS

Mark Ewald, Olympia, Wash., assignor to Special Equipment Company, Portland, Oreg., a corporation of Oregon Application February 15, 1934, Serial No. 711,355

9 Claims. (Cl. 76—104)

This invention has to do with a spoon for use in the removal of the central axial portion of a fruit and relates more particularly to the process of manufacturing such a spoon.

A coring spoon made by the process hereinafter described is preferably adapted for use in a fruit treating machine which operates to halve, core and peel fruit anterior to its being placed in cans or otherwise packed for preservation or for sale. In part, such a fruit treating machine comprises a slotted pad member having journals at opposite sides of the slot for rotatively carrying a coring spoon of the present type. After the fruit has been sliced in half along its longitudinal axis, the fruit halves that are formed as a consequence of the splitting operation are arranged to present their flat faces respectively to the fruit pad so that the pad may be carried into contact therewith. When the pad is firmly engaged with the plane face of the half-fruit portion, means becomes effective to rotate the coring spoon from the pad into the face of the fruit and about the core section thereof to separate it from the fruit.

For a more comprehensive description of the fruit treating machine and coring device, in which the coring spoon made by the present process is adapted for use, reference may be had to the following co-pending applications of the applicant:

Application of Mark Ewald entitled "Coring device", serially numbered 614,062, filed May 28, 1932;

Application of Mark Ewald entitled "Pear treating apparatus," serially numbered 636,447 filed October 6, 1932; and Application of Mark Ewald entitled "Coring device", serially numbered 637,708, filed October 14, 1932.

Objects of the present invention include the provision of a novel process for forming from a blank of sheet material a coring spoon.

The claims of the present application are restricted to the process of forming the coring device. The claims to the article comparable to the process claims of the present case are included in my divisional application Serial Number 746,952, filed October 5, 1934.

These objects and such other objects as may hereinafter appear are obtained by the novel construction, unique arrangement and improved combination of elements illustrated in the accompanying single sheet of drawings, hereby made a part of this specification, and in which:

Figure 1 is a plan view of a blank of metal from which a coring spoon may be formed by following the successive steps of the present process;

Figure 2 is a plan view of the blank of Figure 1 after subjection to one operation of the process of its manufacture;

Figures 3, 4, 5, and 6 are transverse sections taken respectively at the lines 3—3, 4—4, 5—5 and 6—6 of Figure 2;

Figure 7 is a plan view of the blank subsequent to the succeeding step of the process of manufacture;

Figure 8 is a cross sectional view taken at the line 8—8 of Figure 7;

Figure 9 is a perspective view of the coring spoon after a later step of the process has been performed in the making thereof;

Figure 10 is a cross sectional view taken at the line 10—10 of Figure 9 to illustrate the manner in which the coring blade is sharpened and given a circular periphery;

Figure 11 illustrates a fruit pad with which the coring spoon is adapted for combined use in a fruit treating machine; and Figure 12 is a central cross sectional view of the coring spoon taken at the line 12—12 of Figure 11.

Like reference characters are used to designate similar parts in the drawing and in the description of the invention which follows.

The first step in the process of manufacture of a coring blade of the present type consists in the forming of a flat blank of suitable metal shaped as that illustrated in Figure 1. Most frequently the blank 10 will be obtained by stamping it from a larger piece of sheet metal. When a suitable die is used, more than one of the blanks 10 may be formed in a single operation.

Next the blank 10 may be subjected to stamping means for deforming its longitudinal central portion in the manner illustrated in Figures 2, 3, 4, 5 and 6. The trough-like section 11 comprises substantially semi-circular transverse sections throughout its length and extends from end to end across the face of the blank 10. Wing-like sections 12 to either side of section 11 remain in their original relative position to one another, that is, within a single plane. The deformed section 11 consists of five distinct portions designated by the ordinals 13, 14, 15, 16 and 17. In the completed article, sections 13 and 17 provide attaching means for bearing members; section 14 is shaped to register with and sever the calyx section from the fruit; section 15 is shaped for cutting the core proper from the fruit; and section 16 is designed to cut the thready portion from the axial part of the fruit.

After shaping the blank 10 as shown in Figure 2, it is then trimmed of the wing-like sections 12. This may be done by subjecting the blank to a properly designed die member. A narrow section of the wing-like sections 12 and designated 18 in Figures 7 and 8, is left along the edges of the deformed section 11, the narrow section providing material for a cutting edge of the spoon as will be made apparent presently. The member 10 is now treated to curl the sides of the U-shaped section 17 inwardly to make the section circular. Ample space may be left between the opposed edges of the curled section to permit of the insertion of a drill for effecting an aperture 19. At this time an aperture 20 may be made in the opposite end of the member 10. Apertures 19 and 20 provide means of attachment for bearing members 21 and 22.

The member 10 may now be properly termed a "spoon", although the cutting edges have not been formed as yet. Before sharpening the edges of the spoon it is first heated and quenched in oil for tempering to produce the desired hardness. Stainless cutlery steel has proven to be a satisfactory material from which to make the spoon. After tempering, the spoon is attached to an arbor in a manner adapting it to be rotated about its longitudinal axis. An examination of Figure 10 will show the axis to pass centrally of the section 17 and half way between the projecting portions 18 substantially within a plane common therewith. While the spoon is being rotated about its axis a suitable grinding or abrasive instrumentality is carried thereto and moved back and forth between sections 13 and 17. In this manner the outer periphery of the spoon is removed to make the transverse sections thereof circular with respect to the axis of rotation and, concurrently, a cutting edge is formed along the opposed longitudinal edges of each section of the spoon.

An examination of Figures 2, 7, 9 and 10 will make it apparent how the inner periphery of the spoon, along its opposed edges, is curved outwardly. This is due to the action of the swage means employed for shaping the blank as it is illustrated in Figure 2. By leaving the slight projection 18 along the edges of the spoon at the time of trimming the wings 12, the outwardly flared portion of the internal periphery is permitted to extend to and beyond the external periphery as it lies at a point just beneath the portion 18. Thus when the exterior of the spoon is ground down to make it circular, the greater part of the flanged portion 18 will be removed and the cutting edge will be formed flush with the outer periphery of the spoon. By arranging the cutting edge in this way a clean cut is made within the body of the half fruit as the spoon is rotated thereinto and so as to clear a space for the body of the knife. Consequently, the spoon does not press against the wall of the cavity created thereby within the fruit. Should the cutting edge be formed between the inner and outer surfaces of the wall of the spoon, there would be a slight wedging action of the body of the spoon against the side of the cavity along a narrow section just back of the advancing edge. When wedging of this nature occurs the fruit is slightly mutilated and in some instances small pieces will be torn from a fruit.

Figures 11 and 12 show a slotted fruit pad 30 having a flat face 31 for engaging the flat face of a half fruit. Normally the spoon 10 will be retracted into the groove 32 of the pad and the axis of rotation of the spoon will lie within the plane face of the pad. Thus, as the spoon is rotated about its axis, it will be carried out of the pad and about the axial portion of the engaged fruit.

The shank 33 of the pad member 30 may be hollow to contain a spindle 34 having a lug 35 semi-circular in cross section to project into the bearing member 21 for the rotation thereof and the spoon. An aperture 36 may be placed in the lug 35 or a slot in the end thereof to receive the pin portion 37 of a set screw member 38, the latter being for holding the spoon, bearing member 21, and the spindle 34 in assembly. For attaching the bearing member 22 to the opposite end of the spoon a screw 39 having a pin portion 40 may be used. A bearing 41 at the extended end of the pad rotatively contains the bearing member 22. Means (not shown) connected to the shank 33 of the pad and the spindle 34 may be employed to rotate the spoon and pad relatively or in concert.

A truly cylindrical outer spoon wall has been found by test to be essential for successful coring operations. A spoon should revolve through the fruit without undue or irregular pressure. If such spoon is not truly circular, there will be irregular or undue pressure, and a fracture of the fruit may occur either during the coring operation itself or the structure of the pear may be weakened so that a fracture occurs after the fruit has been placed in the can. A study of spoon structure followed by the conception of the present truly cylindrical form of spoon has resulted from a discovery that fruit heretofore packed has frequently split in the cans. From this came a study out of which the present structure was conceived. Fruit which has been cored by the present form of spoon so far has shown no tendency to split.

Another reason for employing a spoon that is truly cylindrical resides in the discovery that superior operation is had when the least amount of pressure is applied upon the adjacent plane surfaces of the fruit. By employing a truly cylindrical spoon, the pressure of the coring paddle with which it is generally associated may be reduced to a minimum. As the coring spoon is inserted into the fruit, the material of the fruit at the interior of the spoon and toward the axis of the fruit is broken away but that to the exterior of the spoon does not. Since the part that is broken away is upon the interior and rejected portion of the fruit and is confined in no way, the rupture of the fruit cells in the direction of the core has no undesirable effect upon the recovered body of the fruit.

The spoon possesses no tendency, because it is truly cylindrical, to exert an uneven pressure at any section of the fruit maintained in a cup or other sustaining member during the coring operation because there is no change in the confining pressure exerted upon the fruit at any radial portion of the spoon. Fruit which has been cored with a truly circular coring spoon has been found to present a smoother appearance internally and to be less susceptible to splitting than when the coring has been accomplished by other means.

What is claimed as new and is desired to be secured by Letters Patent of the United States is:

1. The herein described process of manufacturing a coring spoon and comprising the steps of deforming a blank of sheet metal to effect a channel member of arcuate cross section having outwardly flared longitudinal edges, and removing material from the outer periphery of the channel member to sharpen at least one of such edges and to render the periphery circular with respect to the longitudinal axis of the channel member lying in a plane common to the sharpened edges.

2. The herein described process of manufacturing a coring spoon and consisting of the steps of deforming a sheet metal blank to effect the walls of a channel member of U-section varying in transverse dimensions and having outwardly projecting longitudinal edges, and removing the material from the outer periphery of said walls to sharpen such edges and to make the transverse sections of such outer periphery circular with respect to the longitudinal axis of the channel member.

3. The herein described process of manufacturing a coring spoon and consisting of the steps of forming a metal blank of predetermined shape, pressing said blank to deform a longitudinal portion across the body thereof into a section substantially circular in cross section, trimming the body of the blank to leave short outwardly turned projections at the opposed longitudinal edges of said section, and rotating the section about a longitudinal axis while removing material from the outer periphery thereof to effect the transverse peripheral sections circular with respect to such axis and to sharpen such longitudinal edges.

4. The herein described process of manufacturing a coring spoon and consisting of the steps of forming a metal blank of predetermined shape, pressing said blank to deform a longitudinal portion across the body thereof into a section substantially circular in cross section, trimming the body of the blank to leave short outwardly turned projections at the opposed longitudinal edges of said section, tempering the section, and thereafter rotating the section about a longitudinal axis while removing material from the outer periphery thereof to effect the transverse peripheral sections circular with respect to such axis and to sharpen its longitudinal edges.

5. That process of manufacturing a coring spoon and which comprises the successive steps of deforming a metal blank member into the general shape of a longitudinal peripheral section of the core of a fruit and with the opposed longitudinal edges thereof curved outwardly, and thereafter removing the material from the exterior periphery of said member to sharpen the edges thereof and to impart a truly circular configuration to the transverse peripheral sections thereof with respect to such axis.

6. That process described in claim 5 and in which the blank is first swaged into the general shape of combined longitudinal peripheral sections of the core, thready portions and the calyx of the fruit.

7. The process of forming a coring spoon which comprises deforming a flat blank of sheet metal to provide a centrally disposed, longitudinally extending arcuate channel, the free upper edges of the blank extending laterally from the channel portion and forming wing-like sections remaining substantially in the plane of the original blank of material, trimming off the wing-like sections to form free, longitudinally extending opposed edges, forming the outer wall of the arcuate portion as a true hemisphere, sharpening at least one of said longitudinally extending free edges and forming the end portions of the channel shaped member as mountings about which the spoon is adapted to be turned.

8. The herein described method of making a coring spoon which comprises the forming a flat blank of sheet metal so as to provide a centrally disposed, longitudinally extending arcuate groove having portions along its length formed of variant radii, said radii having a common center, the blank at opposite sides of the central groove extending outwardly in wing-like formation, removing the wings substantially at the top wall of the groove-like portion to provide longitudinally extending free edges, sharpening at least one of said edges and forming at least one of the ends of the channel-shaped member into substantially circular formation to provide a mounting, the central axis of said substantially circular portion being in a plane passing through the longitudinally extending free edges.

9. The process of forming a coring spoon comprising deforming a flat sheet metal blank of substantially rectangular formation centrally of its longitudinal axis to provide a continuous arcuate channel having portions of varying radii extending longitudinally of the blank, removing the flat portions of the original blank not deformed so as to provide opposed, longitudinally extending, free edges at the top portions of the channel-shaped part, forming the opposed ends of the channel-shaped portion to provide arcuate mountings about which the coring device may be rotated, and sharpening at least one of said longitudinal edges.

MARK EWALD.